Oct. 1, 1963
R. L. WHEARLEY ETAL
INSULATED WIRE PARTICULARLY FOR COILS
AND THE MANUFACTURE THEREOF
3,105,287
Filed May 8, 1957
3 Sheets-Sheet 3
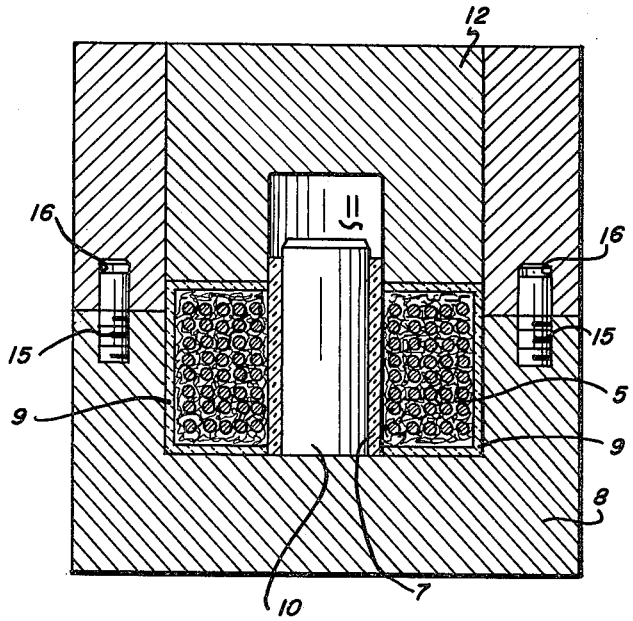
FIG.10
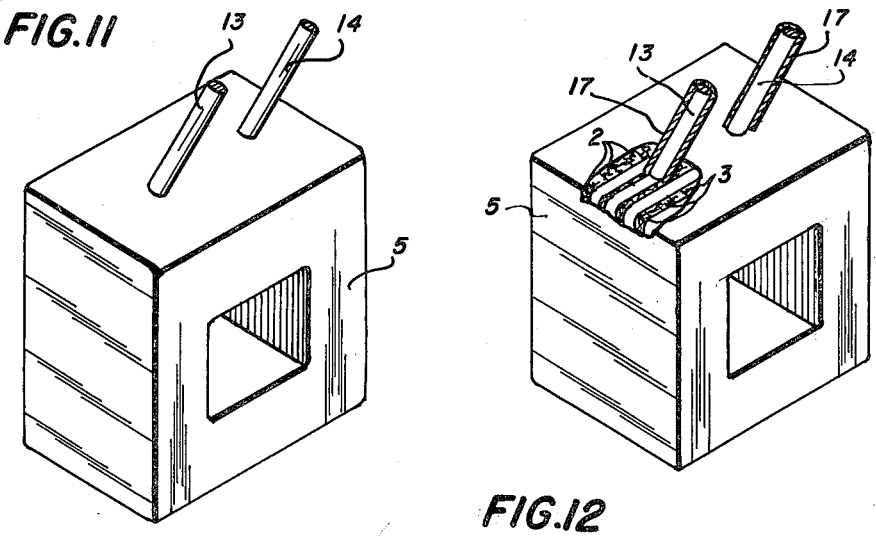
FIG.11
FIG.12
INVENTOR.
ROBERT L. WHEARLEY
EVERT A. MOL
BY
Toulmin & Toulmin
ATTORNEYS United States Patent Office 3,105,287
Patented Oct. 1, 1963

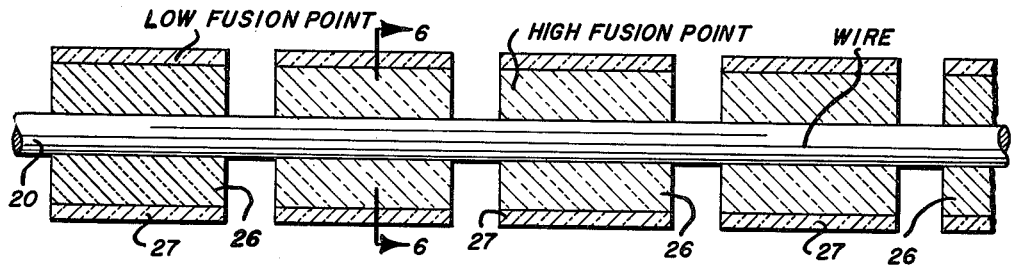
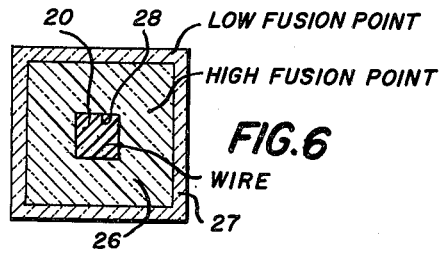
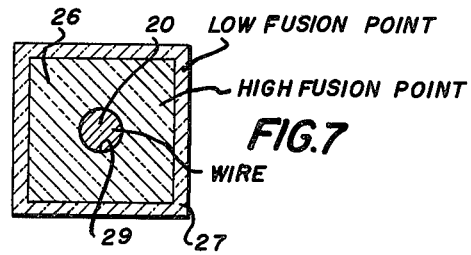
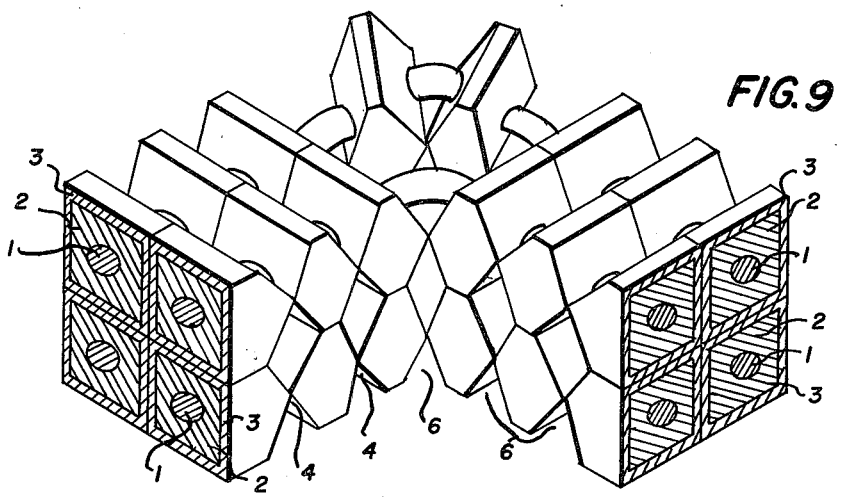
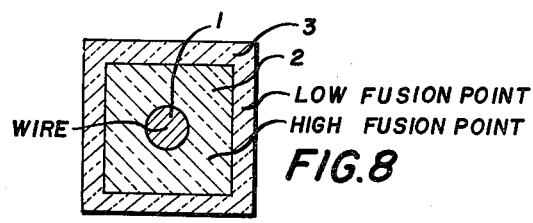

3,105,287
INSULATED WIRE PARTICULARLY FOR COILS
AND THE MANUFACTURE THEREOF
Robert L. Whearley and Evert A. Mol, Fort Wayne, Ind., assignors, by mesne assignments, to Rea Magnet Wire Company, Inc., Fort Wayne, Ind., a corporation of Delaware
Filed May 8, 1957, Ser. No. 657,893
4 Claims. (Cl. 29—155.57)

This invention relates to high temperature-resistant insulated wire and to coils encased in glass, for example.

Inorganic insulation materials such as metallic oxides, glass and the ceramics are relatively brittle materials and have been normally considered as unsuitable for applications to wire wherein the wire must exhibit, at least during manufacture, a degree of flexibility. In the formation of coils a requirement for such flexibility exists and the utilization of relatively brittle materials, as glass, has been hindered by the tendency of the glass to crack resulting in injury to the electrical insulation property of the coil.

Inorganic insulation is desirable particularly on devices such as coils which are to operate at temperatures of 600° F. and above where the organics and semi-organics are generally inferior.

This invention contemplates, in one embodiment, the provision on electrically conductive wire of beads of glass which beads comprise at least two glasses of differing fusion points. In the production of the insulated wire glass of relatively high fusion point is positioned on the wire; this may be accomplished by extruding the glass onto the wire or by providing the glass on the wire in the form of spaced beads. A second and outer layer of a lower fusion point glass is applied to the high fusion point glass either directly on beads of the high fusion point glass—or the outer glass coating may be extruded on and while the material is in a molten state bead-like glass structures may be formed mechanically directly on the wire.

Wire having the glass bead formation, which provides flexibility for winding, is then coiled and placed under heat and pressure sufficient to render the lower softening or fusion point glass flowable while the higher fusion point glass remains solid. Maintaining the inner glass solid holds the coil wires in fixed position and electrically insulated relation while the outer lower softening point glass flows to fill all crevices including any cracks in the insulation which may have possibly occurred in the winding operation. To insure that sufficient lower melting glass is available the mold itself may be lined with the low softening point glass, or any other suitable method of applying such glass to the wound coil may be utilized.

Accordingly a primary object of the present invention is to provide an electrical coil encased in inorganic insulation material such as glass.

An important object of the invention is to provide a novel electrically conductive wire-inorganic insulation combination which may be wound into a coil while maintaining an electrically insulated relationship between adjacent turns.

A particular object of the invention is the provision of a novel method for the production of encased electrical coils.

The invention will be more fully understood by reference to the following detailed description and accompanying drawings wherein:

FIGURE 5 illustrates a modification in which the beads are of a substantially square cross-section;

FIGURE 6 is a sectional view taken substantially on line 6—6 of FIGURE 6 and illustrates the use of a wire of rectangular or square cross-section;

FIGURE 7 is a view similar to that of FIGURE 6 but illustrating the utilization of a wire of circular cross-section in conjunction with beads of rectangular configuration;

FIGURE 8 is a sectional view taken substantially on line 8—8 of FIGURE 1;

FIGURE 9 is a view in perspective of a fragmentary length of the bead-carrying wire illustrating the high degree of flexibility wihch may be achieved with the combination of invention;

Figure 1:
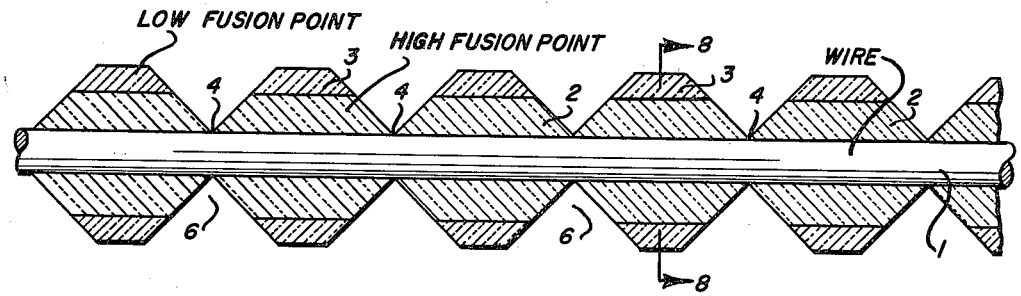
FIGURE 1 is a view partially in section illustrating one form of electrically conductive wire-insulating bead combination.

FIGURE 10 schematically illustrates a coil within a mold;

FIGURE 11 is a perspective view of an encased coil; and

FIGURE 12 is a view of a coil with portions broken away and particularly illustrating an arrangement of the coil leads.

In the drawings for the sake of clarity the illustrations are somewhat enlarged and the beads are shown as being large relative to the wire conductor which is an aid to assembly.

Referring first to FIGURE 1, the numeral 1 designates an electrically conductive wire. This wire may be of copper, steel, nickel silver, aluminum, aluminum coated silver, copper coated alloys such as the nickel-iron alloys, metals of the third and eighth groups of the periodic table and alloys thereof. The application to which the coil is to be directed will have a bearing on the choice of conductor and in general the conductor should have a coefficient of expansion closely matching that of the glass. A nickel-iron alloy containing about 48% by weight of nickel and 52% by weight of iron, copper clad if so desired, is suitable.

The numeral 2 indicates the relatively high fusion point glass which as already noted should closely approximate as to temperature coefficient of expansion the wire 1; in addition this glass 2 should have good electrical insulation properties at the temperature conditions under which the coil is to operate. The soft borosilicate glasses in general satisfy these requirements as do the silica-lime-alumina system glasses.

The numeral 3 designates the low fusion point glass which has a lower softening temperature than the glass 2 and lower than the wire 1. Most suitably however the glass 3 closely approaches the glass 2 as to coefficient of thermal expansion. The low fusion point glass employed will be varied depending upon the coefficient of thermal expansion of glass 2 and in addition upon the softening point desired for glass 3 itself.

This outer glass 3 may suitably embody relatively high percentages of lead oxide, boric oxide and alumina and by appropriately proportioning these components in the glass substantially any thermal coefficient of expansion is attainable while the fusion point of the glass 3 may be maintained low. Thus the glass 3 may suitably be formed to fuse in a temperature range of 900° F. to 1300° F. Such a temperature range is sufficiently low to permit the glass 2 and the metal of the wire to remain solid while the glass 3 fuses and flows under pressure as referred to hereinafter. The fusion point of the glass 2 may be suitably in the range of 1600° F. to 1900° F.

The beads comprising the glasses 2 and 3 may be preformed with openings 4 and brought into abutment on the wire. A suitable length of such wire is then formable into a coil 5 (FIGURE 10) and in such formation the adjacent wires of the coil will be insulated from each other as indicated in FIGURE 9. The numeral 6 indicates spacing which is filled by the flow of low fusion point glass 3 in the molding operation illustrated in FIGURE 10.

In FIGURE 10 there is schematically illustrated a fully wound coil 5 having a core 7 of any suitable material such as glass tubing and formed in accordance with the invention. This coil may be formed to shape in any suitable conventional press arrangement of the art capable of exerting pressure on the coil while the same is heated. In FIGURE 10 the coil is shown positioned in a press mold body 8, the cavity of which may be lined with a glass 9 of the same composition as the glass 3. A pin 10 of the body provides for accurate seating of the coil on the mold and is adapted to extend into recess 11 of plunger 12.

The coil terminals 13, 14 (not shown in FIG. 10) are suitably brought out of the mold in conventional manner.

Guide pins 15, 15 of the mold register with openings 16, 16 to govern registry of the mold. It is to be understood that any suitable form of press may be employed for forming the coil, it being only necessary that there be sufficient heat and pressure to cause glass 3 (and glass 9 if utilized) to flow freely.

The finished coil is illustrated in FIGURE 11. Leads 13, 14 are firmly embedded in the body of solid glass surrounding the coil wire. Such leads may, if desired, be provided with special metal tight-fitting sleeves to insure of optimum adherence of the leads to the glass body. Thus when the coil wire is of copper sleeves of a nickel-iron alloy containing 43% nickel-57% iron by weight and coated with a low fusing glass such as glass 3 may be employed to attain a permanent seal to the glass body. Such sleeves are indicated at 17, 17 in FIGURE 12.

It is to be particularly noted that the beads of glass may be fixed or frictionally retained on the wire when the winding of the coil commences. When fixedly positioned the beads should be sufficiently spaced to provide the necessary degree of flexibility for the wire size being wound. When frictionally retained on the wire the beads may shift very slightly to accommodate the winding operation. In any event the crevices between beads, any cracks occurring in the winding operation, or other spacings will be filled by flow of the glass 3.

Figure 2:
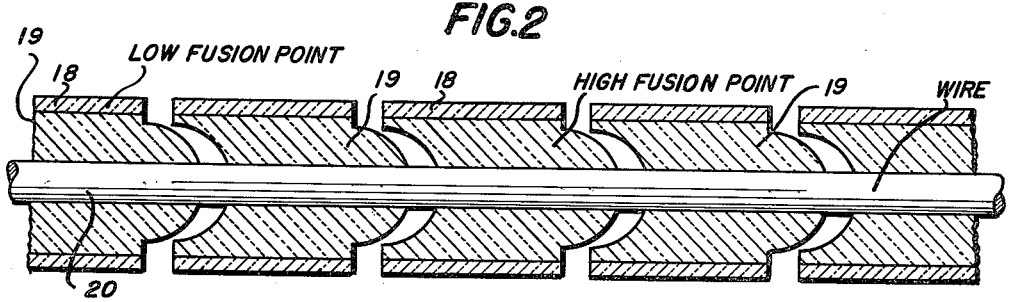
FIGURE 2 is a view similar to that of FIGURE 1 of a further modification in which the beads are preformed and configurated for an interlocking relationship.

In the bead structure shown in FIGURE 2 the beads are composed of the low melting glass 18, the higher melting glass 19 and wire 20 and the beads are formed to interlock, an arrangement which requires less glass flow than the structure of FIGURE 1.

Figure 3:
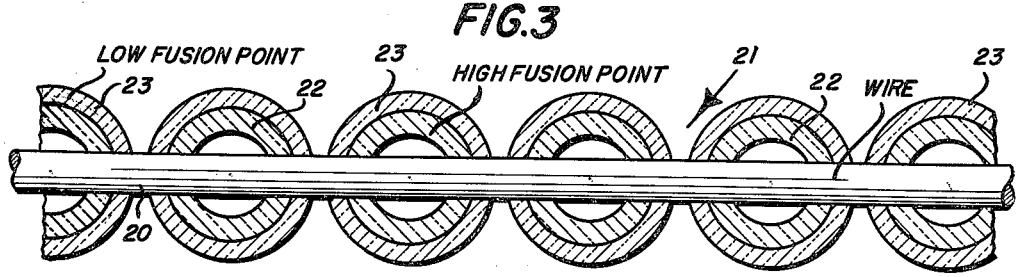
FIGURE 3 illustrates yet another modification in which the preformed beads comprising the two glasses are of circular configuration and hollow.

The hollow circular beads at 21 in FIGURE 3 composed of a high softening glass 22 and an outer sheath 23 of low softening glass are advantageous as the weight of a given coil assembly may be reduced thereby and the free wire length within a bead is somewhat more adapted to accommodate itself to stresses.

Figure 4:
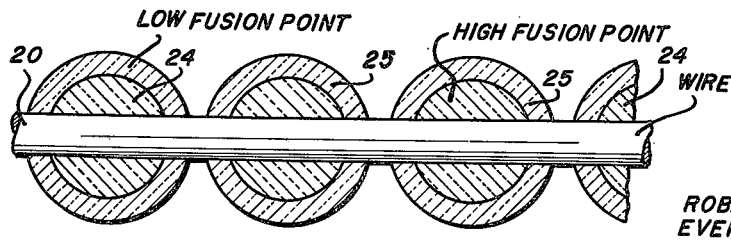
FIGURE 4 illustrates a modification in which the preformed beads are solid.

As illustrated in FIGURE 4 the spherical beads may be solid and comprised of the inner high fusion glass 24 and the outer spherical low fusing glass 25; such beads may in general be of lesser diameter for a given coil size than the structure of FIGURE 3, for example.

Rectangular or square beads which afford ease of manufacture in composite form may comprise the inner high fusion glass 26 and the outer lower fusing glass 27, as shown in FIGURES 5 and 6; the wire section may conveniently be rectangular as at 28 in FIGURE 6, or circular as at 29 in FIGURE 7.

Coils formed with a glass encasement or other similar inorganic encasement are capable of operation at temperatures well in excess of 600° F.; the operating temperature should, of course, be below that at which the glass of low fusion point tends to soften, a factor which is not materially limiting in view of the range of glasses and metals available for formation into the novel structure.

Further the method of invention provides for the maintenance of adjacent wires of a coil in insulated relationship even should cracks appear in the course of manufacture in the insulation close to the wires.

The bead carrying wire has been particularly described in connection with the production of a coil but it will be appreciated that such wire has value in its individual form to protect against heat. However the attainment of adequate flexibility for use in coils and similar formations is of prime importance; in this connection it will be appreciated that wire diameter, the nature of the wire and the thickness of the glass coatings, as well as the stiffness thereof, will be of importance in governing the spacings between bead formations. With the usual magnet wires for coils such spacings may be relatively small, approximating the wire diameter.

The proportion of low fusion point inorganic to the high fusion point inorganic is governed to some extent by bead shape for the amount of low fusion glass, for example, provided in the beads or otherwise must be sufficient to completely fill all spacings. In general by extruding the glass smaller components may be produced as such procedure lends itself to the employment of small amounts of the glass, for example.

The flexibility and ductility of the conductor determine the spacing between beads and the taper of the bead (FIGURE 1) toward the wire may be selected such that with more flexible and ductile conductors, designed for bending to sharp curvatures, the tensive and compressive strains in the glass—both in the inner region of high fusion point and the outer region of low fusion point—will be minimized.

In the completed coil the beads of higher fusion point glass extend along the wire while the lower fusion point material extends over the first glass and through the spacings defined by the first glass and the wire. Thus the turns of the coil are well insulated from each other in the product as well as in the winding operation. The coil may be formed with the core as a component thereof (FIGURE 10) or the core may be removed if so desired.

This application is related to: Serial No. 661,169, Robert L. Whearley, filed May 23, 1957, now Patent No. 2,982,888; title, Electrical Apparatus and Method of Manufacturing the Same. Serial No. 661,170, Robert L. Whearley, filed May 23, 1957, now Patent No. 2,982,889; title, Insulated Winding and Process of Manufacture Thereof. Serial No. 699,965, Robert L. Whearley, Leo J. Novak, and Fritz O. Deutscher, filed, December 2, 1957, now Patent No. 3,012,092; title, Insulated Electrical Equipment and Process of Making. Serial No. 700,044, Robert L. Whearley and Hermann C. N. Heckel, filed, December 2, 1957, now Patent No. 3,030,257; title, Heat Resistant Insulated Electrical Components and Process of Making. Serial No. 700,173, Robert L. Whearley and Hermann C. N. Heckel, filed, December 2, 1957, now abandoned; title, Electrical Components Insulated With Glass and Process of Making; all assigned to the same assignee as the present invention.

It will be understood that this invention is susceptible to modification in order to adapt it to different usages and conditions and accordingly, it is desired to comprehend such modifications within this invention as may fall within the scope of the appended claims.

We claim:

1. A method of forming an encased electrical coil unit which comprises the steps of applying to an electrically conductive flexible wire first a glass insulation layer of relatively high fusion point glass in the form of shiftable glass beads relative to said wire and frictionally retained thereon to provide a composite body having the flexible characteristics of said wire, providing as an outer surface layer on said first insulation material a second glass insulation layer of a lower fusion point, thereafter winding the wire into coil form, said glass beads being individually shiftable relative to said wire to accommodate the said winding of the resultant beaded wire in coil form, thereafter heating the resultant wound coil in a mold to a temperature sufficient to fuse said second and lower fusion point glass layer of said insulation layers to cause the same to flow over and about the turns of the coil and into the spacings defined by the first and high fusion point glass insulation layer and to thereby encase the coil, cooling the encased coil to harden the insulation layers about the coil, and removing the coil from the mold.

2. A method of forming an encased electrical coil unit which comprises the steps of loosely stringing glass beads of a high temperature softening point glass on an electrically conductive flexible wire, providing thereon as an outer surface layer a glass of a lower temperature fusion point than the glass of the beads, said glass beads being shiftable on said wire for retaining the flexible characteristic of the wire, winding the resultant beaded glass wire into a coil with the adjacent turns insulated from each other by said glasses, said glass beads being individually shiftable relative to said wire to accommodate the said winding of the resultant beaded wire in coil form, thereafter heating the wound coil in a mold to cause the lower fusion point glass to melt and flow about the turns of the coil to permanently insulate the same from each other, cooling the encased coil to harden the glass material about the coil, and removing the cooled coil from the mold.

3. A method of forming an encased electrical coil unit which comprises loosely stringing glass beads having an inner region of a high temperature softening point glass and an outer region of a lower temperature softening point glass on a flexible electrically conductive wire to form a composite product composed of glass beads and wire and which retains the flexible characteristic of the wire, winding the composite glass-wire product into a coil in which the turns are insulated from each other by the glass, said glass beads being individually shiftable relative to said wire to accommodate the said winding of the resultant beaded wire in coil form, thereafter heating the coil in a mold to soften only the lower softening temperature glass of the outer region to cause the same to melt and flow about the turns and the higher fusion point glass whereby there is provided a completely glass enclosed wire, cooling the glass to harden the same, and removing the coil from the mold.

4. A method of forming a glass encased electrical coil which comprises the steps of winding an electrically conductive wire into a shape of a coil, said wire having solid glass shapes loosely strung on said wire, said solid glass shapes being composed of a relatively high temperature fusing point glass, applying over the high temperature fusing glass a glass of a lower temperature fusing point, and said glass shapes being individually shiftable relative to said wire to accommodate the winding of the same into a coil, thereafter heating the resultant glass covered coil to a temperature causing said lower fusing glass to melt and flow over said high temperature fusing glass to seal and enclose the coil, and cooling the same to harden the melted glass.

References Cited in the file of this patent
UNITED STATES PATENTS

| | | |
|---|---|---|
| 1,844,501 | Davis | Feb. 9, 1932 |
| 2,105,060 | Strom et al. | Jan. 11, 1938 |
| 2,105,166 | Schwarzkopf | Jan. 11, 1938 |
| 2,404,185 | Mann | July 16, 1946 |
| 2,478,633 | Lord | Aug. 9, 1949 |
| 2,646,535 | Coggeshall et al. | July 21, 1953 |
| 2,739,371 | Grisdale et al. | Mar. 27, 1956 |
| 2,931,852 | Holland et al. | Apr. 5, 1960 |

FOREIGN PATENTS

| | | |
|---|---|---|
| 198,137 | Great Britain | May 31, 1923 |
| 310,102 | Great Britain | Apr. 25, 1929 |
| 710,711 | Great Britain | June 16, 1954 |